United States Patent
Ahn et al.

(10) Patent No.: US 9,731,245 B2
(45) Date of Patent: Aug. 15, 2017

(54) METHOD OF SEPARATING A GAS USING AT LEAST ONE MEMBRANE IN CONTACT WITH AN ORGANOSILICON FLUID

(71) Applicant: Dow Corning Corporation, Midland, MI (US)

(72) Inventors: Dongchan Ahn, Midland, MI (US); Aaron Greiner, Midland, MI (US); James Hrabal, St. Louis, MI (US); Alexandra Lichtor, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 14/413,231

(22) PCT Filed: Sep. 25, 2013

(86) PCT No.: PCT/US2013/061625
§ 371 (c)(1),
(2) Date: Jan. 7, 2015

(87) PCT Pub. No.: WO2014/052419
PCT Pub. Date: Apr. 3, 2014

(65) Prior Publication Data
US 2015/0190747 A1    Jul. 9, 2015

Related U.S. Application Data

(60) Provisional application No. 61/705,663, filed on Sep. 26, 2012, provisional application No. 61/778,952, filed on Mar. 13, 2013.

(51) Int. Cl.

| | |
|---|---|
| *B01D 53/22* | (2006.01) |
| *B01D 53/14* | (2006.01) |
| *B01D 19/00* | (2006.01) |
| *B01D 53/26* | (2006.01) |
| *B01D 71/70* | (2006.01) |
| *B01D 53/18* | (2006.01) |
| *B01D 69/04* | (2006.01) |
| *B01D 69/06* | (2006.01) |
| *B01D 69/10* | (2006.01) |
| *B01D 63/02* | (2006.01) |

(52) U.S. Cl.
CPC ..... *B01D 53/1493* (2013.01); *B01D 19/0073* (2013.01); *B01D 53/1425* (2013.01); *B01D 53/1443* (2013.01); *B01D 53/1475* (2013.01); *B01D 53/18* (2013.01); *B01D 53/228* (2013.01); *B01D 53/229* (2013.01); *B01D 53/263* (2013.01); *B01D 53/268* (2013.01); *B01D 69/04* (2013.01); *B01D 69/06* (2013.01); *B01D 69/10* (2013.01); *B01D 71/70* (2013.01); *B01D 63/02* (2013.01); *B01D 2252/204* (2013.01); *B01D 2252/205* (2013.01); *B01D 2256/10* (2013.01); *B01D 2256/245* (2013.01); *B01D 2257/102* (2013.01); *B01D 2257/104* (2013.01); *B01D 2257/504* (2013.01); *B01D 2257/80* (2013.01); *B01D 2325/027* (2013.01); *Y02C 10/06* (2013.01); *Y02C 10/10* (2013.01)

(58) Field of Classification Search
CPC ............ B01D 19/0073; B01D 53/1425; B01D 53/1443; B01D 53/1475; B01D 53/1493; B01D 53/228; B01D 53/229; B01D 53/263; B01D 53/268; B01D 2252/205; B01D 2256/245; B01D 2257/504; B01D 2257/80; B01D 2325/027
See application file for complete search history.

(56) References Cited

U.S. PATENT DOCUMENTS

| | | |
|---|---|---|
| 3,339,341 A | 9/1967 | Maxwell et al. |
| 3,466,508 A | 9/1969 | Booe |
| 3,491,269 A | 1/1970 | Booe |
| 3,668,183 A | 6/1972 | Hoy |
| 4,115,081 A * | 9/1978 | Ohno ................. B01D 53/1493 95/236 |
| 4,122,029 A | 10/1978 | Gee et al. |
| 4,260,780 A | 4/1981 | West |

(Continued)

FOREIGN PATENT DOCUMENTS

| | | |
|---|---|---|
| DE | 4101045 A1 | 8/1991 |
| DE | 19812960 C1 | 11/1999 |

(Continued)

OTHER PUBLICATIONS

"Corn Equilibrium Moisture Content Table", University of Arkansas, Division of Agriculture, [online], [archived on Dec. 13, 2010]. Retrieved from the Internet: <URL: www.aragriculture.org/storage_drying/emc_table_builder.xls>, (2010), 1 pg.
"International Application Serial No. PCT/US2012/046660, International Preliminary Report on Patentability mailed Jan. 23, 2014", 8 pgs.
"International Application Serial No. PCT/US2012/046660, International Search Report mailed Oct. 8, 2012", 4 pgs.
"International Application Serial No. PCT/US2012/046660, Written Opinion mailed Oct. 8, 2012", 6 pgs.

(Continued)

*Primary Examiner* — Jason M Greene
(74) *Attorney, Agent, or Firm* — Matthew T. Fewkes

(57) ABSTRACT

The present invention relates to a method of removing a gas from a mixture. The method includes contacting a silicone membrane with a feed mixture including at least a first gas component and contacting a second side of the membrane with an organosilicon sweep liquid, producing a retentate mixture depleted in the first gas component and an organosilicon sweep liquid enriched in the first gas component. The invention also provides methods of removing a gas from a liquid, and methods of regenerating and recycling an organosilicon sweep liquid.

16 Claims, No Drawings

(56) References Cited

U.S. PATENT DOCUMENTS

| | | | |
|---|---|---|---|
| 4,276,424 | A | 6/1981 | Peterson, Jr. et al. |
| 4,314,956 | A | 2/1982 | Baney et al. |
| 4,324,901 | A | 4/1982 | West et al. |
| 4,466,202 | A | 8/1984 | Merten |
| 4,510,094 | A | 4/1985 | Drahnak |
| 4,530,879 | A | 7/1985 | Drahnak |
| 4,718,921 | A | 1/1988 | Makino et al. |
| 4,766,165 | A | 8/1988 | Kress et al. |
| 4,871,379 | A | 10/1989 | Edwards et al. |
| 5,002,590 | A | 3/1991 | Friesen et al. |
| 5,017,654 | A | 5/1991 | Togashi et al. |
| 5,034,126 | A | 7/1991 | Reddy et al. |
| 5,387,417 | A | 2/1995 | Rentsch |
| 5,496,961 | A | 3/1996 | Dauth et al. |
| 5,498,339 | A * | 3/1996 | Creusen ............ B01D 53/1443 95/50 |
| 5,811,487 | A | 9/1998 | Schulz, Jr. et al. |
| 6,165,253 | A * | 12/2000 | Sirkar ............... B01D 53/14 86/10 |
| 6,797,212 | B2 | 9/2004 | Montoya |
| 7,858,197 | B2 | 12/2010 | Ahn et al. |
| 8,500,892 | B2 | 8/2013 | Seiler et al. |
| 2002/0165505 | A1 | 11/2002 | Gee et al. |
| 2006/0058451 | A1 | 3/2006 | Gommans et al. |
| 2007/0286783 | A1* | 12/2007 | Carrette ............ B01D 53/1425 423/228 |
| 2010/0319370 | A1 | 12/2010 | Kozubal et al. |
| 2011/0052458 | A1 | 3/2011 | Hu |
| 2011/0291046 | A1 | 12/2011 | Patrone et al. |
| 2011/0308390 | A1 | 12/2011 | Perry et al. |
| 2012/0017762 | A1* | 1/2012 | Seiler ............... B01D 53/1493 95/203 |
| 2012/0187046 | A1* | 7/2012 | Boday ............... B01D 53/228 210/651 |
| 2012/0286783 | A1 | 11/2012 | Constable et al. |
| 2014/0150287 | A1 | 6/2014 | Ahn et al. |
| 2015/0190747 | A1 | 7/2015 | Ahn et al. |

FOREIGN PATENT DOCUMENTS

| | | |
|---|---|---|
| DE | 102004053167 A1 | 5/2006 |
| DE | 102004053167 A1 | 5/2006 |
| EP | 0430331 A1 | 6/1991 |
| EP | 0430331 A1 | 6/1991 |
| EP | 577276 B1 | 8/1997 |
| FR | 2623101 A1 | 5/1989 |
| JP | 55-121337 A | 9/1980 |
| JP | 01-099631 A | 4/1989 |
| JP | 2000-037612 A | 2/2000 |
| JP | 2001-294512 A | 10/2001 |
| PL | 149837 B2 | 3/1990 |
| SU | 975041 A1 | 11/1982 |
| WO | WO-02/070112 A2 | 9/2002 |
| WO | WO-03/101412 A2 | 12/2003 |
| WO | WO-2006/073695 A1 | 7/2006 |
| WO | WO-2010/126694 A1 | 11/2010 |
| WO | WO-2011/150081 A2 | 12/2011 |
| WO | WO-2013/010076 A1 | 1/2013 |
| WO | WO-2014/052419 A1 | 4/2014 |
| WO | WO-2014/052423 A1 | 4/2014 |

OTHER PUBLICATIONS

"International Application Serial No. PCT/US2013/061625, International Search Report mailed Dec. 11, 2013", 4 pgs.

"international Application Serial No. PCT/US2013/061625, Written Opinion mailed Dec. 11, 2013", 9 pgs.

"International Application Serial No. PCT/US2013/061631, International Search Report mailed Dec. 11, 2013", 3 pgs.

"International Application Serial No. PCT/US2013/061631, Written Opinion mailed Dec. 11, 2013", 8 pgs.

"Table N3.1: Equilibrium Moisture Content of Shelled Corn for Various Air Temperatures and Relative Humidities", Guidelines for Mold Control in High-Moisture Corn, USDA Bulletin No. 2238, [online]. [archived on Dec. 22, 2014]. Retrieved from the Internet: <URL: https://web.archive.org/web/20141222205647/http://www.caes.uga.eduldepartments/bae/extension/handbook/doc, (2014), 3 pgs.

"Thin-Layer Drying of Grains and Crops", ASAE 5448 Dec. 1998; [online]. [archived on May 11, 2006]. Retrieved from the Internet: <URL: http://web.archive.org/web/20060511171927/http://www.bime.ntu.edu/tw/~dsfon/graindrying/ASAE/517.pdf>, (Dec. 1998), 3 pgs.

Al-Farayedhi, A. A, et al., "Regeneration of liquid desiccants using membrane technology", *Energy Conversion and Management*, 40(13), (Sep. 1999), 1405-1411.

Darracq, Guillaime, et al., "Silicone oil: An effective absorbent for the removal of hydrophobic volatile organic compounds", *Journal of Chemical Technology and Biotechnology*, 85(2), (Mar. 2010), 309-313.

Dobbins, Craig L., et al., "2011 Purdue Crop Cost & Return Guide", Purdue Extension, ID-166-W, (Jan. 27, 2011), 3 pgs.

Guo, Andrew, et al., "Highly Active Visible-Light Photocatalysts for Curing a Ceramic Precursor1", (Abstract Only), *Chemistry of Mateirals*, 10(2), 531-536, (1998), 1 pg.

Huang, Si-Min, et al., "Fluid flow and heat mass transfer in membrane parallel-plates channels used for liquid desiccant air dehumidification", *International Journal of Heat and Mass Transfer*, 55(9-10), (Apr. 2012), 2571-2580.

Isetti, Carlo, et al., "Three-fluid membrane contactors for improving the energy efficiency of refrigeration and air-handling systems", *International Journal of Ambient Energy*, DOI:10.1080/01430750.2012.755905, (2013), 1-14.

Namvar, Ramin, et al., "+Transient characteristics of a liquid-to-air membrane energy exchanger (LAMEE) experimental data with correlations", *International Journal of Heat and Mass Transfer*, 55(23-24), (Nov. 2012), 6682-6694.

Uhrig, J. William, et al., "Costs of Drying High-Moisture Corn", Grain Quality Task Force, Fact Sheet #3, Purdue University, (Oct. 1, 1992), 4 pgs.

Xia, B., et al., "Regenerative Oil Scrubbing of Volatile Organic Stream in Hollow Fiber Membrane Devices", *Ind. Eng. Chem. Res.*, 38(9), (1999), 3462-3472.

Zhang, Li-Zhi, et al., "Conjugate heat and mass transfer in a cross-flow hollow fiber membrane contactor for liquid dessicant air dehumidification", *International Journal of Heat and Mass Transfer*, 55(25-26), (Dec. 2012), 8061-8072.

* cited by examiner

METHOD OF SEPARATING A GAS USING AT LEAST ONE MEMBRANE IN CONTACT WITH AN ORGANOSILICON FLUID

CROSS REFERENCE TO RELATED APPLICATIONS

This application is a U.S. national stage filing under 35 U.S.C. §371 of PCT Application No. PCT/US13/061625 filed on 25 Sep. 2013, currently pending, which claims the benefit of U.S. Provisional Patent Application No. 61/705,663 filed 26 Sep. 2012 under 35 U.S.C. §119 (e). PCT Application No. PCT/US13/061625 and U.S. Provisional Patent Application No. 61/705,663 are hereby incorporated by reference.

CLAIM OF PRIORITY

This application claims the benefit of priority of U.S. Patent Application Ser. No. 61/705,663, entitled "METHOD OF SEPARATING A GAS USING AT LEAST ONE MEMBRANE IN CONTACT WITH AN ORGANOSILICON FLUID," filed on Sep. 26, 2012, and of U.S. Patent Application Ser. No. 61/778,952, entitled "METHOD AND APPARATUS FOR SEPARATING ONE OR MORE COMPONENTS FROM A COMPOSITION," filed on Mar. 13, 2013, each of which applications is incorporated by reference herein in its entirety.

The use of membranes to separate gases is an important technique that can be used in many industrial procedures. Examples can include recovery of hydrogen gas in ammonia synthesis, recovery of hydrogen in petroleum refining, separation of methane from other components in biogas synthesis, enrichment of air with oxygen for medical or other purposes, removal of water vapor from natural gas, removal of carbon dioxide ($CO_2$) and dihydrogen sulfide ($H_2S$) from natural gas, carbon-capture applications such as the removal of $CO_2$ from flue gas streams generated by combustion processes, degassing of liquids, air purification, dehumidification of air for HVAC and drying systems, dehydration of liquids, and degassing of liquids.

Water needs to be removed on a large scale from many varied materials, including gases, solids, and liquids, as part of many routine industrial operations. For example, in the chemical industry, a particular process step may require that the moisture content of certain gases be below a certain concentration. In another example, a building may require dehumidified air in order to keep its occupants comfortable. Corn and other grains, coffee and other foodstuffs, coal, tobacco, wood, lumber, chemicals, sand, plaster, wastewater sludge, gas including air, and paint are all examples of non-gaseous materials from which water is removed or reduced in concentration on a large scale. However, current methods of drying gases, liquids, and solids can be expensive, time-consuming, inefficient, and inconvenient.

SUMMARY OF THE INVENTION

The present invention provides a method of removing a gas from a mixture, such as a gaseous mixture, using a membrane with a sweep liquid that includes an organosilicon fluid. The present invention also provides methods of removing a gas from a liquid, and methods of regenerating and recycling an organosilicon sweep liquid.

Various embodiments provide certain advantages over other separation methods, some of which are surprising and unexpected. The sweep liquid including an organosilicon fluid can provide enhanced flux of a component desired to be separated through the membrane. In some embodiments, by using a nonporous membrane, less leakage of a sweep liquid occurs, and less clogging of the membrane can occur, as compared to porous or microporous membranes having pores passing all the way through the membrane. By combining the dense membrane with a sweep fluid including an organosilicon fluid, various embodiments of the present invention can provide a clog and leak resistant membrane system requiring less maintenance and having superior separation abilities including greater efficiency and greater degree of separation. In some embodiments, by using a dense unsupported membrane with a sweep fluid, the absence of pores in a porous supports contributes to less fouling and less mass transfer resistance from condensation of absorbates in the pores of the support. For example, the method of the present invention can remove a gas from various gas mixtures, such as $CO_2$ from various gas mixtures, such as $CO_2$ and nitrogen, $CO_2$ and methane, or water from various gas mixtures, such as water and air, more efficiently than other processes, for example, using less energy, using less time, or costing less. In embodiments including separation of water from air, dried air provided by the gas-drying method can be used to dry materials more efficiently than other methods, including using less energy, using less time, or costing less money.

In various embodiments, the present invention provides a method of removing a gas from a mixture. The method includes contacting a first side of a first dense silicone membrane with a feed mixture. The feed mixture includes at least a first gas component. The feed mixture also includes at least one of and a second gas component and a first liquid component. The method also includes contacting a second side of the membrane with a sweep liquid. The sweep liquid includes an organosilicon fluid. The contacting produces a permeate mixture on the second side of the membrane and a retentate mixture on the first side of the membrane. The permeate mixture can include all material on the second side of the membrane, including material that has passed through the membrane, and material that was already on the second side of the membrane. The permeate mixture is enriched in the first gas component. The retentate mixture is depleted in the first gas component.

In various embodiments, the present invention provides a method of removing a gas from a liquid. The method includes contacting a first side of a first dense silicone membrane with a gaseous stream. The method also includes contacting a second side of the membrane with a liquid including an organosilicon fluid. The organosilicon fluid includes a first gas component. The contacting produces a gaseous permeate mixture on the first side of the membrane and a retentate organosilicon fluid on the second side of the membrane. The permeate mixture can include all material on the first side of the membrane, including material that has passed through the membrane, and material that was already on the first side of the membrane. The permeate mixture is enriched in the first gas component. The retentate organosilicon fluid is depleted in the first gas component.

In various embodiments, the present invention provides a method of removing a gas from a mixture. The method includes contacting a first side of a first dense silicone membrane with a feed mixture. The feed mixture includes at least a first gas component. The feed mixture also includes at least one of a second gas component and a first liquid component. The method also includes contacting a second side of the first membrane with a sweep liquid including an organosilicon fluid. The contacting produces a first permeate mixture on the second side of the first membrane and a first retentate mixture on the first side of the first membrane. The first permeate mixture is enriched in the first gas component. The first retentate mixture is depleted in the first gas component. The method also includes contacting a first side of a second dense silicone membrane with a gaseous stream and contacting a second side of the second membrane with the first permeate mixture. The contacting produces a second permeate mixture on the first side of the second membrane and a second retentate on the second side of the membrane. The second permeate mixture is enriched in the first gas component. The second retentate is depleted in the first gas component. The method also includes reperforming the contactings of the first and second side of the first membrane using at least some of the second retentate as at least part of the sweep liquid.

DETAILED DESCRIPTION OF THE INVENTION

Reference will now be made in detail to certain claims of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range. When a range or a list of sequential values is given, unless otherwise specified any value within the range or any value between the given sequential values is also disclosed. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. Examples include acyl, cycloalkyl, aryl, aralkyl, heterocyclyl, heteroaryl, or heteroarylalkyl, linear and/or branched groups such as alkyl groups, fully or partially halogen-substituted haloalkyl groups, alkenyl groups, alkynyl groups, acrylate and methacrylate functional groups; and other organic functional groups such as ether groups, cyanate ester groups, ester groups, carboxylate salt groups, and masked isocyano groups.

The term "substituted" as used herein refers to an organic group as defined herein or molecule in which one or more bonds to a hydrogen atom contained therein are replaced by one or more bonds to a non-hydrogen atom. The term "functional group" or "substituent" as used herein refers to a group that can be or is substituted onto a molecule, or onto an organic group. Examples of substituents or functional groups include, but are not limited to, any organic group, a halogen (e.g., F, Cl, Br, and I); a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "resin" as used herein refers to polysiloxane material of any viscosity that includes at least one siloxane monomer that is bonded via a Si—O—Si bond to three or four other siloxane monomers. In one example, the polysiloxane material includes T or Q groups, as defined herein.

The term "radiation" as used herein refers to energetic particles travelling through a medium or space. Examples of radiation are visible light, infrared light, microwaves, radio waves, very low frequency waves, extremely low frequency waves, thermal radiation (heat), and black-body radiation.

The term "cure" as used herein refers to exposing to radiation in any form, heating, or allowing to undergo a physical or chemical reaction that results in hardening or an increase in viscosity.

The term "dense" as used herein with regard to membranes refers to a liquid material being unable to pass through the membrane without making a phase transition to the gas phase. A dense membrane can be substantially nonporous.

The term "pore" as used herein refers to a depression, slit, or hole of any size or shape in a solid object. A pore can run all the way through an object. A pore can intersect other pores.

The term "nonporous" as used herein with regard to membranes refers to the membrane having substantially no pores that form paths that penetrate all the way through the thickness of the membrane from one major side to the other major side, unless otherwise indicated.

The term "free-standing" or "unsupported" as used herein refers to a membrane with the majority of the surface area on each of the two major sides of the membrane not contacting a substrate, whether the substrate is porous or not. In some embodiments, a membrane that is "free-standing" or "unsupported" can be 100% not supported on both major sides. A membrane that is "free-standing" or "unsupported" can be supported at the edges or at the minority (e.g., less than about 50%) of the surface area on either or both major sides of the membrane.

The term "supported" as used herein refers to a membrane with the majority of the surface area on at least one of the two major sides contacting a substrate, whether the substrate is porous or not. In some embodiments, a membrane that is "supported" can be 100% supported on at least one side. A membrane that is "supported" can be supported at any suitable location at the majority (e.g., more than about 50%) of the surface area on either or both major sides of the membrane.

The term "enrich" as used herein refers to increasing in quantity or concentration, such as of a liquid, gas, or solute. For example, a mixture of gases A and B can be enriched in gas A if the concentration or quantity of gas A is increased, for example by selective permeation of gas A through a membrane to add gas A to the mixture, or for example by selective permeation of gas B through a membrane to take gas B away from the mixture. When a first gas component moves across a membrane into a fluid on the other side, the fluid is enriched in the first gas component, and the combination of the fluid and the gas that permeated the membrane can be referred to as the permeate.

The term "deplete" as used herein refers to decreasing in quantity or concentration, such as of a liquid, gas, or solute. For example, a mixture of gases A and B can be depleted in gas B if the concentration or quantity of gas B is decreased, for example by selective permeation of gas B through a membrane to take gas B away from the mixture, or for example by selective permeation of gas A through a membrane to add gas A to the mixture.

The term "selectivity" or "ideal selectivity" as used herein refers to the ratio of permeability of the faster permeating gas over the slower permeating gas, measured at the same temperature (assumed to be room temperature unless otherwise specified).

The term "permeability" as used herein refers to the permeability coefficient ($P_X$) of substance X through a membrane, where $q_{mx}=P_X*A*\Delta p_X*(1/\delta)$, where $q_{mx}$ is the volumetric flow rate of substance X through the membrane, A is the surface area of one major side of the membrane through which substance X flows, $\Delta p_X$ is the difference of the partial pressure of substance X across the membrane, and $\delta$ is the thickness of the membrane. $P_X$ can also be expressed as $V \cdot \delta/(A \cdot t \cdot \Delta p)$, wherein $P_X$ is the permeability for a gas X in the membrane, V is the volume of gas X which permeates through the membrane, $\delta$ is the thickness of the membrane, A is the area of the membrane, t is time, $\Delta p$ is the pressure difference of the gas X at the retente and permeate side.

The term "Barrer" or "Barrers" as used herein refers to a unit of permeability, wherein 1 Barrer=$10^{-11}$ ($cm^3$ gas) cm $cm^{-2}$ $s^{-1}$ $mmHg^{-1}$, or $10^{-10}$ ($cm^3$ gas) cm $cm^{-2}$ $s^{-1}$ cm $Hg^{-1}$, where "$cm^3$ gas" represents the quantity of the gas that would take up one cubic centimeter at standard temperature and pressure.

The term "total surface area" as used herein with respect to membranes refers to the total surface area of the side of the membrane exposed to the feed gas mixture.

The term "air" as used herein refers to a mixture of gases with a composition approximately identical to the native composition of gases taken from the atmosphere, generally at ground level. In some examples, air is taken from the ambient surroundings. Air has a composition that includes approximately 78% nitrogen, 21% oxygen, 1% argon, and 0.04% carbon dioxide, as well as small amounts of other gases.

The term "room temperature" as used herein refers to ambient temperature, which can be, for example, between about 15° C. and about 28° C.

The term "gas" as used herein includes vapor phase materials.

The term "absorption" or "absorb" as used herein refers to dissolving or carrying an absorbed component. For example, a fluid can absorb a gas as at least one of a dissolved gas, and as bubbles of any suitable size such as to allow transport of the gas in the fluid. An absorption process can include any suitable mechanism, such as chemical interactions (e.g., chemisorption), physical interactions (e.g., physisorption), bulk interactions, surface interactions (e.g., adsorption), or combinations thereof.

The term "desorption" or "desorb" as used herein refers to ejecting an absorbed component.

Method of Gas Separation

The present invention provides methods of using a membrane in combination with a fluid that includes an organosilicon fluid. In some embodiments, the fluid is conveyed through the permeate side of a membrane to help sweep away some or substantially all of a first gas component that permeates through the membrane into the permeate side, thus helping maintain a strong driving force for mass transfer of the first component across the membrane. In some embodiments, the fluid is conveyed through the feed side of a membrane to help introduce a first gas component that permeates through the membrane into the permeate side, thus helping maintain a strong driving force for mass transfer of the first component across the membrane.

In some embodiments, the fluid absorbs a first gas component from a feed gas mixture through the membrane. In other embodiments, the fluid desorbs a first gas component into a gas stream through the membrane. In other embodiments, the fluid absorbs a first gas component from a feed gas mixture through a membrane, then desorbs that first gas component through a separate membrane into a separate gas stream, regenerating the fluid. The fluid can then be reused for further absorptive/desorptive cycles. An embodiment that includes desorption of a first gas from the fluid through a membrane can also include absorption of the first gas into the fluid without the use of a membrane. An embodiment that includes absorption of a first gas into the fluid through a membrane can also include desorption of the first gas from the fluid without the use of a membrane. The methods of the present invention can be utilized to, for example, efficiently separate various mixtures of gases, including $CO_2$ and nitrogen, $CO_2$ and methane, and to dehumidify (e.g., remove water vapor from) a gas. The method of the present invention can be utilized for, for example, dehumidification of air for heating, ventilation, and air conditioning systems (HVAC), drying systems, dehydration of liquids, degassing of liquids, removal of volatile organic components, removal of pollutants such as nitrous or sulfur containing compounds from combustion streams, purification of hydrocarbons, air purification, and $CO_2$ capture.

In various embodiments, the present invention provides a method of removing a first gas component from a feed gas mixture. The method can remove more than one gas component. The removal can include decreasing the concentration of the first gas component in the feed gas mixture, or the removal can include the removal of substantially all of the first gas component from the feed gas mixture. In some embodiments, substantially all of one gas component is removed, while only part of another gas component is removed. In some embodiments, the concentration of one particular gas component can be decreased by a first amount, while the concentration of another particular gas component can be decreased by a second amount that is different than the first amount.

In a method for removing a gas from a mixture, the method includes contacting a first side of a first dense silicone membrane with a feed mixture. The feed mixture includes at least a first gas component. The feed mixture also includes at least one of a second gas component and a first liquid component. The feed mixture can include a first gas component and a second gas component, along with other optional gas or liquid components which can be present or absent. The feed mixture can include a first gas component and a first liquid component, along with other optional gas or liquid components which can be present or absent.

The at least one gas component that is removed from the feed gas mixture in an absorptive method, from the fluid in a desorptive method, or from both in a method that includes absorption and desorption cycles with a recycled fluid, can be any suitable gas component. For example, the first gas component can be water, oxygen, helium, hydrogen, carbon dioxide, nitrogen, ammonia, methane, or hydrogen sulfide. Any suitable proportion of the first gas component can be in a vapor phase. In some embodiments, the method is used for humidification or dehumidification; thus, the first gas component can be water.

The feed gas mixture can be any suitable feed gas mixture that at least includes the first gas component and also includes at least one of another gas component and a liquid component. For example, the feed gas mixture can include oxygen, helium, hydrogen, carbon dioxide, nitrogen, ammonia, methane, hydrogen sulfide, argon, air, volatile organic compounds, nitrous oxides ($NO_X$), sulfur oxides ($SO_X$), volatile siloxanes including linear siloxanes and cyclosiloxanes, or any combination thereof. The feed gas can include any suitable gas known to one of skill in the art. The one or more membranes can be selectively permeable to any one gas in the feed gas (e.g., the first gas component), or to any of several gases in the feed gas. The one or more membranes can be selectively permeable to all but any one gas in the feed gas. The one or more membranes can be selectively permeable to water vapor. The feed gas mixture can be drawn from any suitable source. For example, the feed gas mixture can be drawn from a supply tank, the reaction products of a chemical reaction, gases resulting from petroleum refining, or from hydraulic f racking. In another example, when the feed gas mixture includes air, the feed gas mixture can be drawn from the ambient air.

The feed gas mixture can be contacted to the one or more membranes in any suitable fashion. Preferably, the feed gas mixture is allowed to contact the one or more membranes at a pressure such that there is a positive gradient in partial pressure of the first gas component across the membrane to drive the permeation of the at least one gas component into the permeate side of the membrane. In one example, the feed gas mixture is allowed to contact the one or more membranes at ambient pressure. In another example, both the feed gas mixture/retentate side and the permeate side are kept near ambient pressure, but a sweep fluid or gas introduced to the permeate side allows a positive partial pressure gradient of the first gas component to be maintained. In another example, the feed gas mixture is allowed to contact the one or more membranes such that a pressure difference between the first and second sides of the one or more membranes occurs. The pressure difference can be such that the pressure of the feed gas mixture (on the first side of the one or more membranes) is greater than the pressure at the second side of the one or more membranes. In one example, the pressure difference is caused by the pressure of the feed gas mixture being at above ambient pressure; in such examples, the pressure of the feed gas mixture can be raised above ambient pressure using a fan, blower or compressor. In another example, the pressure difference is caused by the pressure at the second side of the one or more membranes being at below ambient pressure; in such examples, the pressure of the second side of the one or more membranes can be reduced below ambient pressure using any suitable device such as a blower or vacuum pump. In other examples, a combination of lower than ambient pressure at the second side of the one or more membranes, and higher than ambient pressure at the first side of the one or more membranes, contributes to the pressure difference across the one or more membranes. In some embodiments, a higher than ambient pressure on the first side of the one or more membranes can be achieved by pumping feed gas to the first side of the one or more membranes and restricting the exit pathway of the retentate mixture from the one or more membranes. In some examples, if the concentration of the first gas component at the second side of the one or more membranes is allowed to reach certain levels, the rate of separation of the first gas component from the feed gas mixture can be decreased.

In some embodiments, the method can include pressurizing the feed stream with a compressor, blower, or fan. The compressor, blower, or fan can be any suitable compressor, blower, or fan. The pressurization of the feed stream can help to maintain a desired pressure differential across the one or more membranes. In some embodiments, the method can include treating the feed stream with at least one pre-filter to remove particulates. The treatment of the feed stream with at least one pre-filter can occur before or after compression of the feed stream, if the feed stream is compressed. The filter can be any suitable filter that removes particulates from the feed stream.

The method for removing a gas from a mixture also includes contacting a second side of the membrane with a sweep liquid. The sweep liquid includes an organosilicon fluid. The contacting produces a permeate mixture on the second side of the membrane and a retentate mixture on the first side of the membrane. The permeate mixture is enriched in the first gas component; the sweep liquid has at least one of a higher concentration or a higher quantity of the first gas component therein after being contacted with the membrane as compared to the concentration before being contacted with the membrane. The retentate mixture is depleted in the first gas component; the feed gas mixture has at least one of a lower concentration or a lower quantity of the first gas component therein after being contacted with the membrane as compared to the concentration or quantity of the first gas component before being contacted with the membrane. In some embodiments, the feed gas mixture includes carbon dioxide and at least one of nitrogen and methane and the permeate gas mixture is enriched in carbon dioxide. In some embodiments, the feed gas mixture includes at least one of water and water vapor and the permeate gas mixture is enriched in at least one of water and water vapor. In some embodiments, the feed gas mixture includes at least a first gas component and a first liquid component and the permeate gas mixture is enriched in the first gas component.

In embodiments herein, the feed gas mixture or gas stream on one side of the membrane and the liquid on the other side of the membrane can have any suitable flow configuration with respect to one another. The movement of the gas and/or liquid with respect to one another can lessen the concentration of the first gas component immediately adjacent the membrane, which can increase the rate of transfer of the first gas component across the membrane. By moving the liquid and gas with respect to one another, the amount of the liquid and gas contacting the membrane over a given time can be increased or maximized, which can improve the separation performance of the membrane by increasing or optimizing the transfer of the first gas component across the membrane. In some examples, the liquid and feed gas or gas stream flow in similar directions. In other examples, the liquid and feed gas or gas stream flow in at least one of countercurrent or crosscurrent flow. Flow configurations can include multiple flow patterns, for example about 10, 20 30, 40, 50, 60, 70, 80, or 90% of the liquid and gas can have a crosscurrent flow while the other about 90, 80, 70, 60, 50, 40, 30, 20, or 10% of the liquid and gas have a countercurrent flow or a similar flow direction. Any suitable combination of flow patterns is encompassed within embodiments of the present invention. The flow rate of the gas phase on one side of a membrane, and the flow rate of the liquid on the other side of the membrane can be varied independently to give any suitable liquid to gas flow ratio for a membrane system. There can be an optimum range of liquid to gas flow ratios to accomplish a desired separation for a given membrane system, configuration and operating conditions. When a liquid is used to assist in removal of a first gas from a feed gas mixture (as in a membrane absorption processes), the optimal liquid to gas flow ratio can be quite different from the optimal ratio for a process where the first gas is removed from the liquid into another gas stream (as in a membrane desorption process).

In some embodiments, the method for removing a gas from a mixture can also include removing the first gas component from the permeate mixture (e.g., the fluid including an organosilicon fluid) by at least one of decreasing the concentration or quantity of the first gas component in the permeate mixture. The method can further include recirculating the first permeate mixture into contact with the second side of the silicone membrane, allowing reuse of the fluid. Such reuse can enhance efficiency of the separation of the first gas component, and can occur for multiple cycles (e.g., about 2, 3, 4, 5, 10, 100, 1000, or more cycles). By regenerating and recycling the fluid, a dehumidification or degassing process can be efficiently performed. For example, in a dehumidification process, the first permeate mixture can be dried by contacting a first side of a second dense silicone membrane with the first permeate mixture and contacting a second side of the second dense silicone membrane with a dry sweep gas.

In various embodiments, the present invention provides a method of removing a first gas component from a liquid. The method can remove more than one gas component from the liquid. The method includes contacting a first side of a first dense silicone membrane with a gaseous stream or liquid stream. The method also includes contacting a second side of the membrane with a liquid including an organosilicon fluid. The organosilicon fluid includes a first gas component. The gaseous or liquid stream can be any suitable stream that has an absorptive capability for the first gas component. For example, the stream can be a gaseous stream. The method of removing a gas from a liquid can be used, for example, to dehydrate the organosilicon fluid, or to hydrate a gas mixture, such as for humidity control in HVAC and other environmental control systems. In some embodiments, the gaseous stream can be subjected to a process to remove the first gas component therein, allowing recycling and reuse of the gaseous stream, which can occur for multiple cycles. In some embodiments, the gas stream is not recycled.

The gaseous stream includes at least one gaseous component, such as oxygen, helium, hydrogen, carbon dioxide, nitrogen, ammonia, methane, hydrogen sulfide, argon, air (e.g., ambient air or treated/modified air), or any combination thereof. The gaseous stream has a sufficiently low concentration of the first component to enable removal of the first gas component from the liquid including the organosilicon fluid. The gaseous stream has at least some capacity to absorb the first gas component from the fluid including the organosilicon fluid prior to being contacted with the membrane. A particular gaseous composition has a characteristic speed with which it can absorb a particular quantity of a gas component. Different gaseous compositions can have different abilities to absorb certain gas components, with regard to the volume of the gas component that can be absorbed, the total volume of the gas component that can be absorbed, and the concentration of a gaseous component at which the gaseous composition begins to become saturated with the gas component. As the gaseous composition becomes saturated with the gas component, the rate of absorption will be lower. When the gaseous steam is relatively depleted of the gas component, as compared to the concentration at which saturation begins to occur, the rate of absorption of the gas component will be higher.

Therefore, to maximize the efficiency of the removal of the first gas component from the fluid, the gaseous stream can be depleted in the first gas component (as compared to a saturated or semi-saturated state), or introduced at a favorable temperature and pressure to achieve a more rapid transfer of the first gas component from the fluid into the gaseous stream, e.g., to increase the flux of the first gas component across the membrane.

In the method of removing a gas from a liquid, the contacting of the membrane by a gaseous stream on the first side and the fluid on the second side produces a gaseous permeate mixture on the first side of the membrane and a retentate organosilicon fluid on the second side of the membrane. The permeate mixture is enriched in the first gas component; the gas stream has at least one of a higher concentration or a higher quantity of the first gas component therein after being contacted with the membrane as compared to the concentration or quantity of the first gas component before being contacted with the membrane. The retentate organosilicon fluid is depleted in the first gas component; the fluid has at least one of a lower concentration or a lower quantity of the first gas component therein after being contacted with the membrane as compared to the concentration or quantity of the first gas component before being contacted with the membrane.

In various embodiments, the present invention provides a combination of the method of removing at least one gas component from a feed gas mixture and the method of removing at least one gas component from a fluid. Thus, the present invention provides a method of removing a first gas component from a feed gas mixture by absorbing into a fluid through a membrane and subsequently removing the first gas component from the fluid such that the fluid can be reused for multiple cycles of gas component removal.

The membrane can be any suitable membrane or combination of membranes as described further herein. For example, for a method including absorption, or desorption, of a first gas component to or from an organosilicon fluid, the first dense membrane, the second dense membrane, can be a single membrane, or a bank or array of membranes of any size, shape, or form factor, including a module of hollow fiber membranes.

The first component can be water. In various embodiments, the contacting and the sweep fluid can be sufficient for the sweep fluid to absorb about $1.0\text{-}1.0\times10^{-14}$ mol $H_2O/Pa \cdot g$ of the sweep fluid, $1.0\times10^{-3}\text{-}1.0\times10^{-12}$, or about $1.0\times10^{-4}\text{-}1.0\times10^{-10}$ mol $H_2O/Pa \cdot g$ of the sweep fluid. In some embodiments, the contacting and the sweep fluid can be sufficient for the sweep fluid to absorb about $1\times10^{-14}$ or less mol $H_2O/Pa \cdot g$ of the sweep fluid, or about $1\times10^{-13}$, $1\times10^{-12}$, $1\times10^{-11}$, $1\times10^{-10}$, $1\times10^{-9}$, $1\times10^{-8}$, $1\times10^{-7}$, $1\times10^{-6}$, $1\times10^{-5}$, $1\times10^{-4}$, $1\times10^{-3}$, $1\times10^{-2}$, $1\times10^{-1}$, or about 1 or more mol $H_2O/Pa \cdot g$ of the sweep fluid. In some embodiments, the feed composition further includes nitrogen, natural gas, air, or a combination thereof.

The first component can be carbon dioxide. In various embodiments, the contacting and the sweep fluid can be sufficient for the sweep fluid to absorb about $1.0\times10^{-1}\text{-}1.0\times10^{-15}$ mol $CO_2/Pa \cdot g$ of the sweep fluid, $1.0\times10^{-5}\text{-}1.0\times10^{-13}$ mol $CO_2/Pa \cdot g$ of the sweep fluid, or about $1.0\times10^{-6}\text{-}1.0\times10^{-12}$ mol $CO_2/Pa \cdot g$ of the sweep fluid. In some embodiments, the contacting and the sweep fluid can be sufficient for the sweep fluid to absorb about $1\times10^{-15}$, $1\times10^{-14}$, $1\times10^{-13}$, $1\times10^{-12}$, $1\times10^{-11}$, $1\times10^{-10}$, $1\times10^{-9}$, $1\times10^{-8}$, $1\times10^{-7}$, $1\times10^{-6}$, $1\times10^{-5}$, $1\times10^{-4}$, $1\times10^{-3}$, $1\times10^{-2}$, or about $1\times10^{-1}$ or more mol $CO_2/Pa \cdot g$ of the sweep fluid. In some embodiments, the feed composition further includes nitrogen, natural gas, air, or any combination thereof.

The first component can be oxygen. In various embodiments, the contacting and the sweep fluid can be sufficient for the sweep fluid to absorb about $1.0\times10^{-2}\text{-}1.0\times10^{-16}$ mol $O_2/Pa \cdot g$ of the sweep fluid, $1.0\times10^{-6}\text{-}1.0\times10^{-14}$ mol $O_2/Pa \cdot g$ of the sweep fluid, or about $1.0\times10^{-7}\text{-}1.0\times10^{-13}$ mol $O_2/Pa \cdot g$ of the sweep fluid. In some embodiments, the contacting and the sweep fluid can be sufficient for the sweep fluid to absorb about $1\times10^{-16}$, $1\times10^{-15}$, $1\times10^{-14}$, $1\times10^{-13}$, $1\times10^{-12}$, $1\times10^{-11}$, $1\times10^{-10}$, $1\times10^{-9}$, $1\times10^{-8}$, $1\times10^{-7}$, $1\times10^{-6}$, $1\times10^{-5}$, $1\times10^{-4}$, $1\times10^{-3}$, or about $1\times10^{-2}$ or more mol $O_2/Pa \cdot g$ of the sweep fluid. In some embodiments, the feed composition can further include nitrogen, air, or any combination thereof.

Liquid Including an Organosilicon Fluid

The method includes using a liquid including an organosilicon fluid adjacent one side of the membrane. The organosilicon fluid can be at least one of absorbent and adsorbent, e.g., the organosilicon fluid can be a sorbent fluid. The organosilicon fluid includes at least one organosilicon compound, and can additionally include any other suitable compound, including any suitable organic or inorganic component, including components that do not include silicon, including any suitable solvent or non-solvent. The organosilicon fluid can be, for example, a silane (e.g, an organosilane), a polysilane (e.g., an organopolysilane), a siloxane (e.g., an organosiloxane such as an organomonosiloxane or an organopolysiloxane), or a polysiloxane (e.g., an organopolysiloxane), such as any suitable one of such compound as known in the art. The organosilane can be a monosilane, disilane, trisilane, or polysilane. Similarly, the organosiloxane can be a disiloxane, trisiloxane, or polysiloxane. The structure of the organosilicon compound can be linear, branched, cyclic, or resinous. Cyclosilanes and cyclosiloxanes can have from 3 to 12 silicon atoms, alternatively from 3 to 10 silicon atoms, alternatively from 3 to 4 silicon atoms.

In various embodiments, the method results in the absorption of a first gas component from a feed gas mixture into the organosilicon fluid. The absorptive method includes contacting the organosilicon fluid to the side of the dense membrane opposite the side which is contacted by a feed gas mixture, and allowing the organosilicon fluid to absorb the first gas component from the feed gas mixture.

In other embodiments, the method results in the desorption of a first gas component from an organosilicon fluid into a gas. The desorptive method includes contacting the organosilicon fluid to the side of the dense membrane opposite the side which is contacted by a gas stream, and allowing the organosilicon fluid to desorb a first gas component into the gas stream through the membrane. In other embodiments, the method provides a combined absorptive and desorptive method, wherein the organosilicon fluid first absorbs a first gas component from a feed gas mixture and is then regenerated by desorption of the first gas component, allowing reuse of the organosilicon liquid in multiple absorption/desorbtion cycles.

In an absorptive embodiment, the sweep liquid has properties that allow it to absorb the first gas component at a suitable speed, and the sweep liquid can absorb a suitable quantity of the first gas component in a given volume, such that a sufficiently efficient separation process occurs. In a desorptive embodiment, the liquid has properties that allow it to desorb the first gas component to achieve a suitably low concentration of the first gas component in the liquid over a suitable short period of time, such that a sufficiently efficient separation process occurs. In an embodiment that includes absorption and desorption from the liquid, the liquid has properties under the independently chosen process conditions (pressure, temperature, concentrations, flow rates, liquid/gas ratios and membrane areas) that allow it to both absorb and desorb the first gas component over suitable lengths of time and in suitably large volumes, such that a sufficiently efficient absorption and desorption occur. While some liquids including organosilicon fluids can have the right balance of properties allowing efficient combined absorption and desorption processes, others can be better suited for either absorption or desorption process. The liquids including organosilicon fluids of the present invention can be advantageously better suited for absorption, desorption, or for absorption/desorption loops, than other absorbant or desorbant fluids, giving a more energy efficient or cost effective method than other methods of separation of a gas component. It will be appreciated that depending on the use for the fluid, certain characteristics of the fluid may be more valuable. For example, in an absorptive process wherein the fluid is not recycled, predominantly the absorptive properties of the fluid are valuable. In another example, in a desorptive process wherein the fluid is not recycled, predominantly the desorptive properties of the fluid are valuable. However, in a process wherein the fluid is recycled, an effective combination of beneficial absorptive properties and desorptive properties is desirable.

In some embodiments, the organosilicon fluid is an organosilane fluid. In one example, an organosilane can have the formula $R^1_3Si-R^2-SiR^1_3$, wherein $R^1$ is $C_{1-10}$ hydrocarbyl or $C_{1-10}$ halogen-substituted hydrocarbyl, both free of aliphatic unsaturation, linear or branched, and $R^2$ is a hydrocarbylene group free of aliphatic unsaturation having a formula selected from monoaryl such as 1,4-disubstituted phenyl, 1,3-disubstituted phenyl; or bisaryl such as 4,4'-disubstituted-1,1'-biphenyl, 3,3'-disubstituted-1,1'-biphenyl, or similar bisaryl with a hydrocarbon chain including 1 to 6 methylene groups bridging one aryl group to another.

In various embodiments, the organosilicon fluid can be an organosiloxane fluid. In some embodiments, the organosiloxane fluid can include an organopolysiloxane compound. An organopolysiloxane compound can be nonfunctionalized, having only alkyl groups substituted to each siloxy group. An organopolysiloxane compound can be functionalized, having groups other than alkyl groups substituted to at least one siloxy group, such as —OH, —H, halogen, or other groups. For example, an organopolysiloxane can include at least one —OH group, such as an organopolysiloxane diol. An organopolysiloxane can include about 5-15 wt % non-alkyl groups, or about 3-30 wt %, or about 0.1-50 wt % non-alkyl groups.

In some examples, the organopolysiloxane compound has an average of at least one, two, or more than two functional groups (non-alkyl groups) per molecule. The organopolysiloxane compound can have a linear, branched, cyclic, or resinous structure. The organopolysiloxane compound can be a homopolymer or a copolymer. The organopolysiloxane compound can be a disiloxane, trisiloxane, or polysiloxane.

The sweep fluid can include one compound or more than one compound. Examples of the sweep fluid can include one or more of fluids selected from a water-compatible organic polymer and an alcohol-compatible organic polymer. The sweep fluid can further include an alcohol, a diol, a polyol, a solvent, a salt (e.g., lithium chloride), or a combination thereof In some embodiments, the sweep fluid can include a silicone fluid, a glycol, or an aqueous lithium chloride solution. The sweep fluid can include one or more organic compounds dissolved or suspended therein, wherein the compounds can be liquid, solid, or gas (e.g., in pure form at standard temperature and pressure). In some embodiments the sorbent fluid can be pre-charged with a suitable level of the first component at a level suitable for efficient operation of the absorption process or an optional desorption or regeneration process. For example, a sweep fluid for removing water vapor may contain some water at the outset, with the water concentration increasing as the absorption process is performed.

In various embodiments, the organosilicon fluid can include an organosilicon (e.g., an organopolysiloxane or other organosilicon) having at least of a hydroxy group, an ether group, an acrylate group, a methacrylate group, an acrylamide group, a methacrylamide group, and a polyether group; in some embodiments, the group can be silicon-bonded, such as to a terminal or non-terminal silicon atom. For example, the organosilicon can include a silicon-bonded ether (bonded via an alkyl group or via an oxygen-atom), a silicon-bonded polyether (e.g., a homo or heteropolyether bonded via an alkyl group or an oxygen-atom), a silicon-bonded acrylamide or methacrylamide group (e.g., bonded via an alkyl group or via a nitrogen-atom), or a silicon-bonded acrylate or methacrylate group (e.g., bonded via an alkyl group or via a nitrogen-atom). The absorbent organosilicon fluid can include an amount of an organosilicon having at least of a hydroxy group, an ether group, an acrylate group, a methacrylate group, an acrylamide group, a methacrylamide group, and a polyether group such that the organosilicon fluid can absorb at least some of the first component, such as about 0.1 wt % or less, or about 1 wt %, 2, 3, 4, 5, 10, 20, 30, 40, 50, 60, 70, 80, 90, 95, 96, 97, 98, 99, or about 99.9 wt % or more, such as about 1-99.9999 wt %, 1-40 wt %, 1-20 wt %, 1-10 wt %, 40-99.999 wt %, or about 50-99.99 wt %. In some examples, an organosilicon including at least one hydroxy group can be a hydroxydiorganosilyl-terminated polydiorganosiloxane, such as a hydroxyldimethylsilyl-terminated polydimethylsiloxane, a hydroxyl methylvinylsilyl-terminated polymethylvinylsiloxane, a hydroxyl-terminated polymethylvinylsiloxane-polydimethylsiloxane random copolymer, a hydroxydiorganosilyl-terminated polyalkyl(haloalkyl)siloxane, a hydroxylmethyl(trifluoromethylethyl)silyl-terminated polymethyl(trifluoromethylethyl)siloxane, a hydroxyl-terminated polydimethylsiloxane oligomer diol, or a hydroxyl-terminated oligomeric trifluoropropyl methylsiloxane. In various embodiments, an organosilicon having at least one ether or polyether group can be a hydroxy-terminated 3-(3-hydroxypropyl)-heptamethyltrisiloxane which has been ethoxylated (e.g., poly(ethylene oxide) substituted at one or more hydroxy groups, or a hydroxyl-terminated heptamethyl-3-(propyl(poly(ethylene oxide)) trisiloxane), an acetoxy-terminated heptamethyl-3-(propyl(poly(ethylene oxide)) trisiloxane, and blends of such organopolysiloxanes having at least one ether or polyether group with hydroxyl-terminated polydimethylsiloxane oligomer diols and capped polyethers.

In some embodiments, the sweep fluid can include a silicone fluid; in some embodiments, the sweep fluid can be a silicon fluid. As used herein, a silicone fluid is any fluid that includes at least one organopolysiloxane. The silicone fluid can include any one or more components in addition to the at least one organopolysiloxane, for example, any suitable solvent, a silane (e.g., an organosilane), a polysilane (e.g., an organopolysilane), or suitable components that do not include silicon. In some embodiments, the silicone fluid can include any sweep fluid as described herein. In other embodiments, the silicone fluid includes predominantly one or more organopolysiloxanes. In various embodiments, the silicone fluid can include 0.1 wt % or less organopolysiloxane, or 1 wt %, 2, 3, 4, 5, 10, 20, 30, 40, 50, 60, 70, 80, 90, 95, 96, 97, 97, 98, 99, or about 99.9 wt % or more organopolysiloxane. In some embodiments, the silicone fluid can include about 1-99.9999 wt %, 40-99.999 wt %, or about 60-99.99 wt % organopolysiloxane.

The organopolysiloxane compound can be any suitable organopolysilxoane compound. The structure of the organosilicon compound can be linear, branched, cyclic, or resinous. The organopolysiloxane compound can be a homopolymer or a copolymer. The organopolysiloxane compound can be a disiloxane, trisiloxane, or polysiloxane.

In some embodiments, the organopolysiloxane can include only siloxy-repeating units (e.g., can be non-copolymeric). In other embodiments, the organopolysiloxane can be a copolymer that includes at least one other repeating unit in addition to siloxy-repeating units. In some examples, the other repeating unit in the copolymer can be formed by a water-compatible organic polymer, an alcohol-compatible organic polymer, or any combination thereof.

An organosilicon compound can contain an average of about 0.001 mole % to about 100 mole % of a silicon-bonded group that is at least one of at least one of a hydroxy group, an ether group, an acrylate group, a methacrylate group, an acrylamide group, a methacrylamide group, and a polyether group, and any range of mole % therebetween, such as about 0.001 mole % or less, or about 0.01, 0.1, 0.5, 1, 2, 3, 4, 5, 6, 8, 10, 12, 14, 16, 18, 20, 25, 30, 40, 50, 60, 70, 80, 90, 95, 96, 97, 98, 99, or about 99.9 mole % or more. In an organopolysiloxane, the mole percent of silicon-bonded functional groups is the ratio of the number of moles of siloxane units in the organopolysiloxane having the silicon-bonded group to the total number of moles of siloxane units in the organopolysiloxane, multiplied by 100.

Silicone Membrane

The method of the present invention includes the use of one or more dense silicone membranes. The one or more silicone membranes can include a cured product of an organosilicon composition, such as any suitable polysiloxane. Curing the composition that forms the membrane can include a variety of methods, including, for example, the curing of the organosilicon composition can be hydrosilylation curing, condensation curing, free-radical curing, amine-epoxy curing, radiative curing, evaporative curing, cooling, or any combination thereof.

Some types of pores can penetrate from one major side of a membrane to another major side, such as cylindrical pores shaped approximately as cylinders, or such as sponge pores, for example pores that include randomly shaped cavities or channels, that form a connection from one major side to the other major side. Some types of pores do not penetrate from one major side of a membrane to another major side, such as blind pores, also referred to as surface pores. Some types of sponge pores can also not penetrate from one major side of the membrane to the other major side. In some embodiments, the dense membrane of the present invention can include substantially no pores, including both pores that penetrate from one major side to the other major side, and including pores that do not penetrate from one major side to the other major side, such as less than about 100,000 pores per $mm^2$, or less than about 10,000, 1000, 100, 50, 25, 20, 15, 10, 5, or less than about 1 pore per $mm^2$. In some embodiments, the dense membrane can include substantially no pores that penetrate from one side to the other, such as less than about 100,000 penetrating pore per $mm^2$, or less than about 10,000, 1000, 100, 50, 25, 20, 15, 10, 5, or less than about 1 penetrating pore per $mm^2$, but the membrane can also include any suitable number of pores that do not penetrate from one major side of the membrane to the other major side of the membrane, such as at least one of surface pores and sponge pores, such as equal to or more than about 100,000 non-penetrating pores per $mm^2$, or less than 10,000, 1000, 100, 50, 25, 20, 15, 10, 5, or equal to or more than about 1 non-penetrating pore per $mm^2$. In some embodiments, the dense membrane can have substantially zero pores penetrating from one major side of the membrane to the other major side having a diameter larger than about 0.00001, 0.0001, 0.001, 0.005, 0.01, 0.05, 0.1, 0.2, 0.3, 0.4, 0.5, 0.6, 0.7, 0.8, 0.9, 1, or larger than about 2 μm, such as less than about 100,000 pores per $mm^2$, or less than about 10,000, 1000, 100, 50, 25, 20, 15, 10, 5, or less than about 1 pore per $mm^2$. Pore size can be determined by the average size of the pore throughout its path through the entire thickness or only partway through the membrane. Pore size can be determined by the average size of the pore at the surface of the membrane. Any suitable analytical technique can be used to determine the pore size. Embodiments encompass dense membranes having any combination of approximate maximum sizes from the dimensions given in this paragraph for each of the pores passing all the way through the membrane, cylinder pores, sponge pores, blind pores, any other type of pore, or combination thereof. In some embodiments, the dense membrane does have at least one of pores passing all the way through the membrane, cylinder pores, sponge pores, blind pores, and any other type of pore, wherein the pores have a size smaller than the maximum size of the dimensions given in this paragraph.

The one or more membranes of the present invention can have any suitable thickness. In some examples, the one or more membranes have a thickness of about 1 μm to about 20 μm, or about 2, 3, 4, 5, 6, 7, 8, 9, 10, 11, 12, 13, 14, or 15 μm to about 20 μm. In some examples, the one or more membranes have a thickness of about 0.1 μm to about 200 μm, or about 10, 15, 20, 25, or 30 μm to about 200 μm. In other examples, the one or more membranes have a thickness of about 0.01 μm to about 2000 μm, or about 10, 15, 20, 25, 30, 40, 50, or 60 μm to about 2000 μm.

The one or more membranes of the present invention can be selectively permeable to one substance over another. In one example, the one or more membranes are selectively permeable to one gas over other gases or liquids. In another example, the one or more membranes are selectively permeable to more than one gas over other gases or liquids. In one embodiment, the one or more membranes are selectively permeable to one liquid over other liquids or gases. In another embodiment, the one or more membranes are selectively permeable to more than one liquid over other liquids. In an embodiment, the one or more membranes are selectively permeable to water, carbon dioxide, or methane over other gases or liquids. In some examples, the membrane has a $CO_2/N_2$ selectivity at room temperature of at least about 1-150, 10-75, or about 20-40 when tested without the liquid present. In some examples, the membrane has a $CO_2/CH_4$ selectivity at room temperature of at least about 1-150, 10-75, or about 20-40 when tested without the liquid present. In some embodiments, the membrane has a $CO_2$ permeation coefficient of about 0.001 or less, or at least about 0.01 Barrer, 0.1, 1, 5, 10, 20, 30, 40, 50, 60, 70, 80, 90, 100, 120, 140, 160, 180, 200, 240, 280, 300, 400, 500, 600, 700, 800, 900, 1000, 1200, 1400, 1600, 1800, or at least about 2000 Barrer, when tested at room temperature without the liquid present. In some embodiments, the membrane has a $CH_4$ permeation coefficient of at least about 0.001 Barrer or less, or at least about 0.001, 0.01, 0.1, 1, 2, 4, 6, 8, 10, 12, 14, 16, 18, 20, 30, 40, 50, 60, 70, 80, 90, or at least about 100 Barrer, when tested at room temperature without the liquid present. In some examples, the membrane has an $H_2O$/nitrogen selectivity of at least about 50, at least about 90, at least about 100, at least about 120, at least about 130, at least about 150, at least about 200, or at least about 250 at room temperature, when tested at room temperature without the liquid present. In some embodiments, with a the one or more membranes has an $H_2O$ in air vapor permeability coefficient of at least about 10,000 Barrer, 15,000 Barrer, 20,000 Barrer, 25,000 Barrer, 30,000 Barrer, 35,000 Barrer, 40,000 Barrer, 50,000 Barrer, 60,000 Barrer, or at least about 70,000 Barrer at room temperature, when tested at room temperature without the liquid present. Permeability can be measured in any suitable fashion, for example, as described in the Examples.

The one or more membranes of the present invention can have any suitable shape. In some examples, the one or more membranes of the present invention are plate-and-frame membranes, spiral wound membranes, tubular membranes, capillary fiber membranes, or hollow fiber membranes. The one or more membranes can be a hollow fiber membrane module containing a plurality of hollow fiber membranes, each fiber having a bore side and a shell side. The fibers in a hollow fiber membrane module can collectively have a bore side and a shell side accessible through a single connector on each side of the module. Alternately, the fibers in a hollow fiber membrane module can have a bore side and a shell side accessible through multiple connectors placed at various points in the module. In some embodiments of the method, the gaseous mixture can be contacted to the bore side of the one or more hollow fiber membranes, and the organosilicon fluid can be contacted to the shell side. In other embodiments of the method, the gaseous mixture can be contacted to the shell side of the one or more hollow fiber membranes, and the organosilicon fluid can be contacted to the bore side. In embodiments, the gas or liquid contacted to the shell side and bore side can be introduced in any flow pattern with respect to one another that is known in the art, for example crosscurrent (e.g., shell and bore side streams move at approximately right angles to one another), co-current (e.g., shell and bore side streams move in approximately the same direction with respect to one another), or countercurrent (e.g., shell and bore side streams move in approximately opposite directions with respect to one another), or combinations thereof, with flow relationships occurring in, for example, a linear or radial pattern.

The one or more membranes can be free-standing or supported by a porous substrate. In some embodiments, the pressure on either side of the one or more membranes can be about the same. In other embodiments, there can be a pressure differential between one side of the one or more membranes and the other side of the one or more membranes. For example, the pressure on the feed and retentate side of the one or more membranes can be higher than the pressure on the permeate side of the one or more membranes. In other examples, the pressure on the permeate side of the one or more membranes can be higher than the pressure on the retentate side of the one or more membranes.

Any number of membranes can be used to accomplish the separation. Any combination of free-standing and supported membranes can be used. Any suitable surface area of the one or more membranes can be used. For example, the surface area of each membrane, or the total surface area of the membranes, can be about 0.01 m$^2$, 0.1, 1, 2, 3, 4, 5, 10, 100, 200, 300, 400, 500, 600, 700, 800, 900, 1000, 1200, 1400, 1600, 1800, 2000, 2200, 2400, 2600, 2800, 3000, 3200, 3400, 3800, 4000, 5000, 10,000, 50,000, 100,000, 500,000, or about 1,000,000 m$^2$.

In one example, the one or more membranes are one or more hollow tube or fiber membranes. Any number of hollow tube or fiber membranes can be used. For example, 1 hollow tube or fiber membrane, 2, 3, 4, 5, 10, 20, 50, 100, 500, 1000, 2000, 5000, 10,000, 100,000 or about 1,000,000 hollow tube or fiber membranes can be used together as the one or more membranes. The one or more hollow tube or fiber membranes can be in the form of a modular cartridge, such that the one or more membranes can be easily replaced or maintained. In one embodiment, the inside of the one or more hollow tube or fiber membranes can be the first side of the one or more membranes, and the outside of the one or more hollow tube or fiber membranes can be the second side of the one or more membranes. In another embodiment, the outside of the one or more hollow tube or fiber membranes can be the first side of the one or more membranes, and the inside of the one or more hollow tube or fiber membranes can be the second side of the one or more membranes. In some examples, a pressure difference is maintained between the first and second side of the one or more hollow tube or fiber membranes.

In some embodiments, various embodiments of the present invention can provide a module that allows limited or no heat transfer from the sweep fluid to the feed components or retentate components or vice versa. In other embodiments, various embodiments of the present invention can provide a module that allows substantial heat transfer from the sweep fluid to the feed components or retentate components or vice versa. For example, the present invention can provide a system that allows concurrent heat and mass exchange between the feed composition and the sorbent fluid, as exemplified by a membrane based liquid desiccant air conditioner.

In some embodiments of the present invention, the membrane is supported on a porous or highly permeable non-porous substrate. The substrate can be any suitable substrate. A supported membrane has the majority of the surface area of at least one of the two major sides of the membrane contacting a porous or highly permeable non-porous substrate. A supported membrane on a porous substrate can be referred to as a composite membrane, where the membrane is a composite of the membrane and the porous substrate. The porous substrate on which the supported membrane is located can allow gases or liquids to pass through the pores and to reach the membrane. The supported membrane can be attached (e.g., adhered) to the porous substrate. The supported membrane can be in contact with the substrate without being adhered. The porous substrate can be partially integrated, fully integrated, or not integrated into the membrane.

In some embodiments of the present invention, the membrane is unsupported, also referred to as free-standing. The majority of the surface area on each of the two major sides of a membrane that is free-standing is not contacting a substrate, whether the substrate is porous or not. In some embodiments, a membrane that is free-standing can be 100% unsupported. A membrane that is free-standing can be supported at the edges or at the minority (e.g., less than 50%) of the surface area on either or both major sides of the membrane. A free-standing membrane can have any suitable shape, regardless of the percent of the free-standing membrane that is supported. Examples of suitable shapes for free-standing membranes include, for example, squares, rectangles, circles, tubes, cubes, spheres, cones, cylinders, and planar sections thereof, with any thickness, including variable thicknesses.

Cured Product of an Organosilicon Composition

The one or more membranes of the present invention can include the cured product of an organosilicon composition. The organosilicon composition can be any suitable organosilicon composition. The curing of the organosilicon composition gives a cured product of the organosilicon composition. The curable organosilicon composition includes at least one suitable organopolysiloxane compound. The silicone composition includes suitable ingredients to allow the composition to be curable in any suitable fashion. In addition to the at least one suitable polysiloxane, the organosilicon composition can include any suitable additional ingredients, including any suitable organic or inorganic component, including components that do not include silicon, or including components that do not include a polysiloxane structure. In some examples, the cured product of the silicone composition includes a polysiloxane.

The curable silicon composition can include molecular components that have properties that allow the composition to be cured. In some embodiments, the properties that allow the silicone composition to be cured are specific functional groups. In some embodiments, an individual compound contains functional groups or has properties that allow the silicone composition to be cured by one or more curing methods. In some embodiments, one compound can contain functional groups or have properties that allow the silicone composition to be cured in one fashion, while another compound can contain functional groups or have properties that allow the silicone composition to be cured in the same or a different fashion. The functional groups that allow for curing can be located at pendant or, if applicable, terminal positions in the compound.

The silicon composition can include an organic compound. The organic compound can be any suitable organic compound. The organic compound can be, for example, an organosilicon compound. The organosilicon compound can be any organosilicon compound. The organosilicon compound can be, for example, a silane (e.g, an organosilane), a polysilane (e.g., an organopolysilane), a siloxane (e.g., an organosiloxane such as an organomonosiloxane or an organopolysiloxane), or a polysiloxane (e.g., an organopolysiloxane), such as any suitable one of such compound as known in the art. The silicone composition can contain any number of suitable organosilicon compounds, and any number of suitable organic compounds. An organosilicon compound can include any functional group that allows for curing.

In some embodiments, the organosilicon compound can include a silicon-bonded hydrogen atom, such as organohydrogensilane or an organohydrogensiloxane. In some embodiments, the organosilicon compound can include an alkenyl group, such as an organoalkenylsilane or an organoalkenyl siloxane. In other embodiments, the organosilicon compound can include any functional group that allows for curing. The organosilane can be a monosilane, disilane, trisilane, or polysilane. Similarly, the organosiloxane can be a disiloxane, trisiloxane, or polysiloxane. The structure of the organosilicon compound can be linear, branched, cyclic, or resinous. Cyclosilanes and cyclosiloxanes can have from 3 to 12 silicon atoms, alternatively from 3 to 10 silicon atoms, alternatively from 3 to 4 silicon atoms.

In one example, an organohydrogensilane can have the formula $HR^1{}_2Si—R^2—SiR^1{}_2H$, wherein $R^1$ is $C_{1-10}$ hydrocarbyl or $C_{1-10}$ halogen-substituted hydrocarbyl, both free of aliphatic unsaturation, linear or branched, and $R^2$ is a hydrocarbylene group free of aliphatic unsaturation having a formula selected from monoaryl such as 1,4-disubstituted phenyl, 1,3-disubstituted phenyl; or bisaryl such as 4,4'-disubstituted-1,1'-biphenyl, 3,3'-disubstituted-1,1'-biphenyl, or similar bisaryl with a hydrocarbon chain including 1 to 6 methylene groups bridging one aryl group to another.

The organosilicon compound can be an organopolysiloxane compound. In some examples, the organopolysiloxane compound has an average of at least one, two, or more than two functional groups that allow for curing. The organopolysiloxane compound can have a linear, branched, cyclic, or resinous structure. The organopolysiloxane compound can be a homopolymer or a copolymer. The organopolysiloxane compound can be a disiloxane, trisiloxane, or polysiloxane.

The organopolysiloxane compound can be a single organopolysiloxane or a combination including two or more organopolysiloxanes that differ in at least one of the following properties: structure, viscosity, average molecular weight, siloxane units, and sequence.

Embodiments of the membrane include a cured product of a silicone composition. Various methods of curing can be used, including any suitable method of curing, including for example hydrosilylation curing, condensation curing, free-radical curing, amine-epoxy curing, radiation curing, cooling, or any combination thereof.

Various embodiments can be better understood by reference to the following examples which are offered by way of illustration. All experiments were conducted at 22±1° C. unless otherwise noted. Unless otherwise noted, the sweep fluids were used as-received from sealed high density plastic or glass containers.

REFERENCE EXAMPLE 1

Membrane Absorption

A dry compressed air stream was fed to a bubbler, which included a 1 L stainless steel cylinder (Swagelok Model 304L-HDF4-1000) containing de-ionized water. Air flow rate was controlled with a rotameter (Dwyer Model RMB-54-SSV). The moistened air exiting the bubbler was fed bore-side to a dense nonporous unsupported crosslinked silicone hollow fiber module (MedArray Inc.) having 0.83 $m^2$ membrane area, having about 11,000 polydimethylsiloxane-based fibers. The hollow fibers comprising the module each had an outer diameter of 300 μm and wall thickness of 55 μm, with an active length of approximately 8 cm. The relative humidity (RH) and temperature of the air was monitored at both the bore-side inlet and outlet with digital humidity sensors (Omega Model HX86A). The liquid sweep was pumped shell-side to the hollow fiber module with a peristaltic pump (Cole-Parmer Masterflex Model 77200-60), countercurrent to the air stream by being introduced through an orifice located at the centerline of the cynlindrical fiber bundle on the end opposite the feed port. Stainless steel tubing and Tygon tubing (St. Gobain, R-3603) were used for passage of the air, and Masterflex Tygon tubing (Model 06475-18) was used for the liquid sweep. When changing between fluids, the liquid lines were thoroughly purged by pumping the next fluid for several minutes prior to attaching a module dedicated to that fluid type. This eliminated potential issues with mixed fluid effects from change-overs.

REFERENCE EXAMPLE 2

Membrane Desorption

Dry compressed air was fed directly bore-side to a crosslinked silicone hollow fiber membrane module described in Reference Example 1. For trials with a moderately wet air feed, the dry air was first passed through the bubbler as described previously, before being fed into the module. In the case of Comparative Example C20 and Example 85, a comparably designed but lower area module having a nominal surface area of 0.25 m² was used (MedArray Inc.), having about 3300 polydimethylsiloxane-based fibers. This module was comprised of dense nonporous unsupported silicone hollow fibers of the same dimensions as the larger modules. Air flow rate was controlled with a rotameter (Dwyer Model RMB-54-SSV). The RH and temperature of the air was monitored at both the bore-side inlet and outlet with digital humidity sensors (Omega Model HX86A). The liquid sweep was pumped shell-side to the hollow fiber module with a peristaltic pump (Cole-Parmer Masterflex Model 77200-60), countercurrent to the air stream, as described for Reference Example 1. Stainless steel tubing and Tygon tubing (St. Gobain, R-3603) were used for passage of the air, and Masterflex Tygon tubing (06475-18) was used for the liquid sweep. When changing between fluids, the liquid lines were thoroughly purged by pumping the next fluid for several minutes prior to attaching a module dedicated to that fluid type. This eliminated potential issues with mixed fluid effects from change-overs.

Membrane Absorption Experiments

COMPARATIVE EXAMPLES C1, C2, C3, C4, C5, C11, C12

The method of Reference Example 1 was used to test the intrinsic change in relative humidity between feed and retentate streams by passing the wet air stream at a specified feed RH content and feed rate through the bore side of the silicone hollow fiber module. No sweep fluid was used in these examples. The difference between the RH meters of the feed and retentate streams was recorded using the following formula: ΔRH=Feed RH−Retentate RH, all reported in %. Details are shown for each Comparative Example in Table 2.

EXAMPLES 1-55, COMPARATIVE EXAMPLES C6-C10

The method of Reference Example 1 was used to test the change in relative humidity between feed and retentate streams by passing the wet air stream at a specified feed RH content and feed rate through the bore side of the silicone hollow fiber module while simultaneously flowing an organosilicon fluid (or ethylene glycol in the case of Comparative Examples C6-C10) at a given pump setting (calibrated to a flow rate), and the difference between the RH of the feed and retentate streams was recorded as ΔRH. The various sweep fluids are summarized in Table 1. Results and experimental conditions are shown for each Example in Table 2. In Table 2, the term "used" before a fluid indicates that the fluid had previously been cycled through an absorption experiment at least one time. In each set of these experiments, the ΔRH measured when a sweep fluid was used was significantly greater than the baseline ΔRH obtained from the corresponding 'dry' Comparative Experiment listed at the beginning of each series in Table 2, indicating the increased efficiency in water vapor removal (dehumidification) afforded by sweeping the shell with the fluid under the conditions specified.

TABLE 1

Summary of Sweep Fluids Used In Membrane Studies

| Fluid | Description | Source | Kinematic Viscosity (cSt) at 25° C. | Wt % OH |
|---|---|---|---|---|
| A | Trimethylsilyl terminated polydimethylsiloxane | Dow Corning | 50 | 0 |
| B | Hydroxyldimethylsilyl-terminated polydimethylsiloxane | Dow Corning | 42 | 4.0 |
| C | Hydroxylmethyl(trifluoromethylethyl)silyl-terminated polymethyl(trifluoromethylethyl)siloxane | Dow Corning | 100 | 6.2 |
| D | Hydroxylmethylvinylsilyl-terminated polymethylvinylsiloxane | Dow Corning | 32 | 2.8 |
| E | Hydroxyl-terminated polymethylvinylsiloxane-polydimethylsiloxane random copolymer* | Dow Corning | 20 | 8.3 |
| F | Hydroxyldimethylsilyl-terminated polydimethylsiloxane | Dow Corning | 72 | 1.4 |
| G | Hydroxy-terminated heptamethyl-3-(propyl(poly(ethylene oxide)) trisiloxane | Dow Corning | 60 | 2.1 |
| H | Hydroxy-terminated heptamethyl-3-(propyl(poly(ethylene oxide)) trisiloxane | Dow Corning | 40 | 2.8 |
| I | Acetoxy-terminated heptamethyl-3-(propyl(poly(ethylene oxide)) trisiloxane | Dow Corning | 30 | 0 |
| J | Methoxy-terminated heptamethyl-3-(propyl(poly(ethylene oxide)) trisiloxane | Dow Corning | 30 | 0 |

*Denotes that terminal groups are randomly distributed between hydroxylmethylvinylsilyl groups, hydroxyldimethylsilyl groups. A small fraction of the hydroxyl terminal groups are substituted by methoxy groups.

Examples 1-55, taken together with the Comparative Examples C1-C5, and C11, C12 provide evidence that sweeping an organosilicon fluid through one side of a dense silicone membrane module can produce a significant decrease in the concentration of one species of a gas mixture on the other side of the module, and that organopolysiloxane fluids can provide significant dehumidification of a wet air stream. These examples taken in light of Comparative Examples C6-C10 show that, in light of the concentration of —OH groups in each fluid, the magnitude of water vapor removal afforded by the siloxane fluids is disproportionately high relative to ethylene glycol, a well known hydrophilic, water soluble fluid that has a much higher concentration of —OH groups than any of the siloxane fluids.

Membrane Desorption Studies (Regeneration of the Sweep Fluid)

COMPARATIVE EXAMPLES C13, C14, C16, C17, C18, C20

The method of Reference Example 2 was used to test the intrinsic change in relative humidity between feed and retentate streams by passing a dry, or moderately wet, air stream at a measured feed RH content and feed rate through the bore side of the silicone hollow fiber module. No sweep fluid was used in these control experiments, and the difference between the RH of the feed and retentate streams was recorded using the following formula: $\Delta RH = $ Feed RH − Retentate RH, all reported in %. Results and experimental conditions are shown for each Example in Table 3.

EXAMPLES 56-86, COMPARATIVE EXAMPLES C15, C19

The method of Reference Example 2 was used to test the change in relative humidity between feed and retentate streams by passing a dry air stream at a measured feed RH content and feed rate through the bore side of the silicone hollow fiber module while simultaneously flowing an organosilicon fluid that had been cycled through the membrane absorption cycle previously to absorb water (or a fresh, as-received relatively dry organosilicon fluid in the case of Comparative Example C15) at a given pump setting (calibrated to a flow rate), and the difference between the RH meters of the feed and retentate streams was recorded as $\Delta RH$. A negative $\Delta RH$ value corresponds to a case where water vapor is returned to the feed side gas mixture from the organosilicon fluid. Thus, negative values indicate successful drying (regeneration) a fluid that had absorbed water in a previous study. In the case of Example 86, it was found that the fluid was received with a high level of moisture, and is therefore denoted as "wet". Results and experimental conditions are shown for each Example in Table 3.

The Examples 56-86, taken together with the Comparative Examples C13, C14, C16-C18, and C20 provide evidence that at least one gas or vapor phase component of organosilicon fluid mixture on one side of a dense silicone membrane can be removed by passing a separate gas on the other side of the membrane, wherein the second gas contains a lower partial pressure of the one gas or vapor phase component. Comparative Examples C13-C14 show that ethylene glycol that had been used previously for absorption cannot be regenerated under similar conditions, giving evidence that organosilcon sweep liquids are particularly well-suited for efficient use in gas separation processes involving sequential absorption and desorption of a first gas from a mixture, such as water vapor from air.

TABLE 2

Absorption Examples.

| Example | Sweep Fluid | Sweep Flow Rate, ml/min | Feed Flow Rate, SCFH | Feed RH, % | Retentate RH, % | Δ RH, % |
|---|---|---|---|---|---|---|
| C1 | None | 0 | 30 | 60.3 | 56.1 | 4.2 |
| 1 | Used A | 428 | 30 | 60 | 53.3 | 6.7 |
| 2 | Used A | 702 | 30 | 59.9 | 52.5 | 7.4 |
| 3 | Used A | 839 | 30 | 59.9 | 52.1 | 7.8 |
| 4 | Used A | 1113 | 30 | 59.9 | 51.8 | 8.1 |
| 5 | Used A | 291 | 30 | 59.9 | 53.6 | 6.3 |
| 6 | Used A | 1386 | 30 | 59.9 | 51.9 | 8 |
| 7 | Used A | 839 | 50 | 58.3 | 47.8 | 10.5 |
| C2 | None | 0 | 30 | 59.4 | 55.5 | 3.9 |
| 8 | Used B | 215 | 30 | 59.2 | 39.2 | 20 |
| 9 | Used B | 456 | 30 | 59.1 | 37.7 | 21.4 |
| 10 | Used B | 697 | 30 | 59 | 37 | 22 |
| C3 | None | 0 | 10 | 59.7 | 56.4 | 3.3 |
| 11 | B | 215 | 10 | 63.8 | 20.4 | 43.4 |
| 12 | B | 215 | 10 | 65.9 | 21.6 | 44.3 |
| 13 | B | 215 | 60 | 59.7 | 39.2 | 20.5 |
| 14 | B | 215 | 60 | 57.9 | 38 | 19.9 |
| 15 | B | 697 | 10 | 60.3 | 24 | 36.3 |
| 16 | B | 697 | 10 | 59.7 | 23 | 36.7 |
| 17 | B | 697 | 60 | 58.6 | 36.5 | 22.1 |
| 18 | B | 697 | 60 | 59.8 | 38.2 | 21.6 |
| 19 | B | 456 | 35 | 54.7 | 33.8 | 20.9 |
| 20 | B | 456 | 35 | 54.3 | 32.9 | 21.4 |
| 21 | B | 456 | 35 | 52.7 | 32.3 | 20.4 |
| 22 | B | 13.2 | 50 | 56.6 | 37.7 | 18.9 |
| 23 | B | 28.4 | 50 | 56.4 | 35.4 | 21 |
| 24 | B | 41.6 | 50 | 56.2 | 34.7 | 21.5 |
| 25 | B | 13.2 | 30 | 59.8 | 39.6 | 20.2 |
| 26 | B | 28.4 | 30 | 60 | 36.5 | 23.5 |
| 27 | B | 41.6 | 30 | 60 | 35.3 | 24.7 |
| 28 | B | 53 | 30 | 60 | 35.2 | 24.8 |
| 29 | B | 13.2 | 10 | 64.3 | 28.3 | 36 |
| 30 | B | 28.4 | 10 | 64.4 | 24.7 | 39.7 |
| 31 | B | 41.6 | 10 | 64.3 | 23.4 | 40.9 |
| 32 | B | 53 | 10 | 64.3 | 23.1 | 41.2 |
| C4 | None | 0 | 30 | 92.5 | 91.6 | 0.9 |
| 33 | B | 41.6 | 10 | 93.6 | 35.6 | 58 |
| 34 | B | 28.4 | 10 | 93.7 | 36 | 57.7 |
| 35 | B | 13.2 | 10 | 93.7 | 40.7 | 53 |
| 36 | B | 41.6 | 30 | 92.4 | 58.2 | 34.2 |
| 37 | B | 28.4 | 30 | 92.4 | 63.4 | 29 |
| 38 | B | 13.2 | 30 | 92.4 | 70.1 | 22.3 |
| 39 | B | 41.6 | 50 | 90.1 | 68 | 22.1 |
| 40 | B | 28.4 | 50 | 90.3 | 69.5 | 20.8 |
| 41 | B | 13.2 | 50 | 90.5 | 73.2 | 17.3 |
| C5 | None | 0 | 30 | 60.4 | 58.2 | 2.2 |
| C6 | Ethylene glycol | 219 | 30 | 60.3 | 27.5 | 32.8 |
| C7 | Ethylene glycol | 475 | 30 | 60.3 | 26.9 | 33.4 |
| C8 | Ethylene glycol | 731 | 30 | 60.3 | 26.7 | 33.6 |
| C9 | Ethylene glycol | 859 | 30 | 60.3 | 26.6 | 33.7 |
| C10 | Ethylene glycol | 347 | 30 | 60.3 | 26.8 | 33.5 |
| C11 | None | 0 | 30 | 63.7 | 62.2 | 1.5 |
| 42 | C | 551 | 30 | 62.5 | 35.7 | 26.8 |
| 43 | Used C | 551 | 30 | 61.6 | 35.0 | 26.6 |
| 44 | Used C | 551 | 30 | 61.7 | 35.9 | 25.8 |
| 45 | Used C | 551 | 30 | 61.7 | 36.5 | 25.2 |
| 46 | Used C | 551 | 30 | 60.6 | 37.7 | 22.9 |
| 47 | Used C | 551 | 50 | 58.9 | 39.0 | 19.9 |
| 48 | Used C | 292 | 30 | 60.1 | 37.6 | 22.5 |
| C12 | None | 0 | 30 | 61.2 | 58.4 | 2.8 |
| 49 | D | 226 | 30 | 61.1 | 35.2 | 25.9 |
| 50 | D | 478 | 30 | 61.1 | 32.7 | 28.4 |
| 51 | D | 731 | 30 | 61 | 31.7 | 29.3 |
| 52 | Used D | 478 | 50 | 59.4 | 37.4 | 22 |
| 53 | Used D | 478 | 20 | 61.2 | 31 | 30.2 |
| 54 | Used D | 731 | 30 | 60.5 | 35.7 | 24.8 |
| 55 | Used D | 478 | 30 | 60.4 | 37.7 | 22.7 |

TABLE 3

Desorption Examples (Stripping Membrane)

| Example | Sweep Fluid | Sweep Flow Rate, ml/min | Feed Flow Rate, SCFH | Feed RH, % | Retentate RH, % | Δ RH, % |
|---|---|---|---|---|---|---|
| C13 | None | 0 | 50 | 5.9 | 5.7 | 0.2 |
| 56 | Used A | 291 | 50 | 7 | 9.2 | -2.2 |
| C14 | None | 0 | 30 | 0.5 | 0.0 | 0.5 |
| C15 | B | 456 | 30 | 0.4 | 3.2 | -2.8 |
| 57 | Used B | 456 | 50 | 0.5 | 12.3 | -11.8 |
| 58 | Used B | 697 | 50 | 0.5 | 12.9 | -12.4 |
| 59 | Used B | 697 | 30 | 0.5 | 20.2 | -19.7 |
| 60 | Used B | 456 | 30 | 0.6 | 20 | -19.4 |
| 61 | Used B | 456 | 20 | 0.5 | 24.7 | -24.2 |
| 62 | Used B | 215 | 20 | 0.5 | 24.3 | -23.8 |
| C16 | None | 0 | 25 | 25.3 | 20.6 | 4.7 |
| 63 | Used B | 215 | 25 | 25.8 | 30.4 | -4.6 |
| 64 | Used B | 215 | 25 | 25.9 | 31.2 | -5.3 |
| 65 | Used B | 697 | 25 | 24.5 | 30.8 | -6.3 |
| 66 | Used B | 697 | 25 | 24.8 | 31.0 | -6.2 |
| C17 | None | 0 | 50 | 1.3 | 0 | 1.3 |
| 67 | Used B | 28.4 | 50 | 1.3 | 10.3 | -9 |
| 68 | Used B | 41.6 | 50 | 1.3 | 11.0 | -9.7 |
| 69 | Used B | 13.2 | 50 | 1.3 | 8.5 | -7.2 |
| 70 | Used B | 13.2 | 30 | 1.3 | 13.3 | -12.0 |
| 71 | Used B | 28.4 | 30 | 1.3 | 16.0 | -14.7 |
| 72 | Used B | 41.6 | 30 | 1.3 | 17.0 | -15.7 |
| 73 | Used B | 53 | 30 | 1.3 | 17.3 | -16.0 |
| 74 | Used B | 13.2 | 10 | 1.3 | 26.0 | -24.7 |
| 75 | Used B | 28.4 | 10 | 1.3 | 28.1 | -26.8 |
| 76 | Used B | 41.6 | 10 | 1.3 | 29.0 | -27.7 |
| 77 | Used B | 53 | 10 | 1.3 | 29.5 | -28.2 |
| C18 | None | 0 | 30 | 0.3 | 0 | 0.3 |
| C19 | Used Ethylene Glycol | 475 | 30 | 0.3 | 0 | 0.3 |
| 78 | Used C | 292 | 30 | 0.6 | 10.8 | -10.2 |
| 79 | Used C | 292 | 20 | 0.6 | 13.0 | -12.4 |
| 80 | Used C | 551 | 20 | 0.6 | 13.4 | -12.8 |
| 81 | Used C | 551 | 50 | 0.5 | 9.6 | -9.1 |
| 82 | Used D | 479 | 30 | 0.0 | 12.1 | -12.1 |
| 83 | Used D | 479 | 20 | 0.0 | 15.7 | -15.7 |
| 84 | Used D | 731 | 20 | 0.0 | 16.2 | -16.2 |
| C20† | None | 0 | 20 | 1.0 | 0 | 1.0 |
| 85† | Used E | 492 | 20 | 1.0 | 27.5 | -26.5 |
| 86 | Wet F | 364 | 30 | 0.2 | 44.5 | -44.3 |

†Indicates that the 0.25 m² module was used for these experiments

EXAMPLE 87

Membrane Water Vapor Absorption

A dry compressed air stream was fed to a bubbler, which included a 1 L stainless steel cylinder (Swagelok Model 304L-HDF4-1000) containing de-ionized water. Air flow rate was controlled with a rotameter (Dwyer Model RMB-54-SSV). The moistened air exiting the bubbler was fed bore-side to a dense nonporous unsupported crosslinked silicone hollow fiber module (MedArray Inc.) having 0.75 m² membrane area. The gas/vapor feed mixture of air and water vapor entered the bore-side of the membrane module at a volumetric flow rate of 30 scfh at various inlet dew points. Sweep fluids G, H, I, and J were each independently pumped through the shell side of the membrane module at a flow rate of 600 cfm, contacted the membrane, and absorbed water vapor that permeated the membrane. A dried air stream exited the module as the retentate. The rate of water vapor removal in grains per hour for various inlet dew points is given in Tables 4-7 below.

TABLE 4

Sweep Fluid G.

| Inlet dew point (° C.) | Water vapor removal rate (grains/hr) |
|---|---|
| 14.6 | 84.7 |
| 11.7 | 67.5 |
| 8.8 | 53.2 |
| 4.3 | 36.5 |
| 0.1 | 25.2 |

TABLE 5

Sweep Fluid H.

| Inlet dew point (° C.) | Water vapor removal rate (grains/hr) |
|---|---|
| 13.5 | 83.1 |
| 10.9 | 66.2 |
| 8.9 | 51.9 |
| 4.1 | 32.4 |
| -0.5 | 22.3 |

TABLE 6

Sweep Fluid I.

| Inlet dew point (° C.) | Water vapor removal rate (grains/hr) |
|---|---|
| 13.6 | 80.0 |
| 10.5 | 58.4 |
| 8.7 | 43.6 |
| 3.9 | 26.0 |
| -1.3 | 11.8 |

TABLE 7

Sweep Fluid J.

| Inlet dew point (° C.) | Water vapor removal rate (grains/hr) |
|---|---|
| 13.9 | 72.8 |
| 11.5 | 60.0 |
| 8 | 43.5 |
| 4.3 | 31.2 |
| -1.3 | 17.6 |

EXAMPLE 88

Membrane Water Vapor Absorption Using Blended Sorbents

A gas/vapor feed mixture of air and water vapor of volumetric flow rate 20 scfh at various inlet dew points entered the bore side of a membrane module consisting of dense nonporous unsupported crosslinked silicone hollow fibers (MedArray Inc.) of surface area 0.75 m². Sweep Fluid G, and a blend of 80 wt % Sweep Fluid G and 20 wt % Sweep Fluid B (Fluid Blend 1) were each independently pumped through the shell side of the membrane module at a flow rate of 600 cfm, contacted the membrane, and absorbed water vapor that permeated the membrane. A dried air stream exited the module as the retentate. The rate of water vapor removal in grains per hour for various inlet dew points is given in Table 8 below.

TABLE 8

| | Inlet dew point (° C.) | Water vapor removal rate (grains/hr) |
|---|---|---|
| Sweep Fluid G | 16.0 | 56.1 |
| Fluid Blend 1 | 17.2 | 57.1 |

EXAMPLE 89

Membrane Water Vapor Absorption and Desorption Using Blended Sorbents

A gas/vapor feed mixture of air and water vapor of volumetric flow rate 20 scfh at various inlet dew points entered the bore side of a membrane module consisting of dense nonporous unsupported crosslinked silicone hollow fibers (MedArray Inc.) of surface area 0.75 m². Sweep Fluid G and Fluid Blend 1 were each independently pumped through the shell side of the membrane module at a flow rate of 600 cfm, contacted the membrane, and absorbed water vapor that permeated the membrane until the fluid was saturated with water vapor. Dry air at various inlet dew points entered the bore side of a membrane module having dense nonporous unsupported crosslinked silicone hollow fibers (MedArray Inc.) of surface area 0.75 m². The rate of water vapor desorption from the saturated fluid to the dry air in grains per hour is given in the Table 9 below.

TABLE 9

| | Inlet dew point (° C.) | Water vapor removal rate (grains/hr) |
|---|---|---|
| Sweep Fluid G | −44.6 | 69.3 |
| Fluid Blend 1 | −60.0 | 56.3 |

EXAMPLE 90

Continuous Water Vapor Absorption and Desorption Using Two Membrane Modules and a Recycled Sorbent A gas/vapor feed mixture of air and water vapor of volumetric flow rate 1 scfm at an inlet dew point of 17.9° C. entered the bore side of a membrane module, denoted Module 1, consisting of dense nonporous unsupported crosslinked silicone hollow fibers (MedArray Inc.) of surface area 2.1 m². Sweep fluid G was pumped through the shell side of Module 1 and cooled to 15° C. prior to entering Module 1. Sweep fluid G contacted the membrane and absorbed water vapor that permeated the membrane. A dried air stream exited Module 1 as the retentate. Sweep fluid G exiting Module 1 was heated to 35° C. prior to entering the shell side of a membrane module, denoted Module 2, consisting of dense nonporous unsupported crosslinked silicone hollow fibers (MedArray Inc.) of surface area 2.1 m². The flow rate of sweep fluid G was 40 g/min. A gas/vapor mixture of air and water vapor of volumetric flow rate 0.67 scfm entered the bore side of Module 2 to regenerate sweep fluid G. The water vapor removal rate in grains/hr between the feed entering Module 1 and the retentate exiting Module 1 is included in Table 10. The rate of water vapor desorption from sweep fluid G in grains/hr in Module 2 is included in Table 11.

TABLE 10

| | Inlet dew point of air/water vapor mixture entering Module 1 (° C.) | Water vapor removal rate (grains/hr) |
|---|---|---|
| Sweep Fluid G | 17.9 | 169.4 |

TABLE 11

| | Inlet dew point of air/water vapor mixture entering Module 2 (° C.) | Water vapor removal rate (grains/hr) |
|---|---|---|
| Sweep Fluid G | 11.5 | 128.1 |

COMPARATIVE EXAMPLE C21

Water Vapor Absorption Using a 1.25 m² Porous Membrane

A gas/vapor feed mixture of air and water vapor of volumetric flow rate 30 scfh at an inlet dewpoint of 14.5° C. entered the tube side of a membrane module comprising porous polypropylene hollow fibers (Membrana Liqui-cell Superphobic) of surface area 1.25 m². Sweep Fluid G was pumped through the shell side of the membrane module at a flow rate of 40 ml/min, contacted the membrane, and absorbed water vapor that permeated the membrane. A dried air stream exited the module as the retentate. The rate of water vapor removal in grains per hour and the water vapor flux in grains/hour-m² for this test is given in the first full row of Table 12.

EXAMPLE 91

Water Vapor Absorption Using a 1.0 m² Dense Silicone Membrane

A gas/vapor feed mixture of air and water vapor of volumetric flow rate 30 scfh at an inlet dewpoint of 14.1° C. entered the tube side of a membrane module comprising dense nonporous unsupported crosslinked silicone hollow fibers (MedArray Inc.) of surface area 1 m². Sweep Fluid G was pumped through the shell side of the membrane module at a flow rate of 40 ml/min, contacted the membrane, and absorbed water vapor that permeated the membrane. A dried air stream exited the module as the retentate. The rate of water vapor removal in grains per hour and the water vapor flux in grains/hour-m² for this test is given in the second full row of Table 12.

COMPARATIVE EXAMPLE C22

Water Vapor Desorption Using a 1.25 m² Porous Membrane

A dry air stream of volumetric flow rate 30 scfh at an inlet dewpoint of −60° C. entered the tube side of a membrane module comprising porous polypropylene hollow fibers (Membrana Liqui-cell Superphobic) of surface area 1.25 m². A wet Sweep Fluid G containing 1.8 wt % water was pumped through the shell side of the membrane module at a flow rate of 40 ml/min, contacted the membrane, and desorbed the water into the air stream. A humidified air stream exited the module as the retentate. The rate of water vapor removal in grains per hour and the water vapor flux in grains/hour-m² for this test is given in the third full row of Table 12.

EXAMPLE 92

Water Vapor Desorption Using a 1.0 m² Dense Silicone Membrane

A dry air stream of volumetric flow rate 30 scfh at an inlet dewpoint of −60° C. entered the tube side of a membrane module comprising dense nonporous unsupported cross-linked silicone hollow fibers (MedArray Inc.) of surface area 1 m². A wet Sweep Fluid G containing 1.8 wt % water was pumped through the shell side of the membrane module at a flow rate of 40 ml/min, contacted the membrane, and desorbed the water into the air stream. A humidified air stream exited the module as the retentate. The rate of water vapor removal in grains per hour and the water vapor flux in grains/hour-m² for this test is given in the 4th full row of Table 12.

TABLE 12

| | Inlet dew point (° C.) | Water vapor removal rate (grains/hr) | Water Vapor Flux (grains/hr-m²) |
|---|---|---|---|
| Absorption - Example C21 Porous Membrane | 14.4 | 93.4 | 74.72 |
| Absorption - Example 91 Dense Silicone Membrane | 14.0 | 101.9 | 101.9 |
| Desorption - Example C22 Porous Membrane | −60.0 | 36.9 | 29.5 |
| Desorption - Example 91 Dense Silicone Membrane | −60.0 | 55.7 | 55.7 |

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

We claim:

1. A method of removing a gas from a mixture, the method comprising:
   contacting a first side of a first dense silicone membrane, wherein the first dense silicone membrane is a free-standing membrane, with a feed mixture comprising a first gas component and at least one of a second gas component and a first liquid component; and
   contacting a second side of the membrane with a sweep liquid consisting essentially of an organosilicon fluid consisting essentially of a silane, a polysilane, a siloxane, a polysiloxane or a combination of two or more of a silane, a polysilane, a siloxane, and a polysiloxane, to produce a permeate mixture on the second side of the membrane and a retentate mixture on the first side of the membrane, wherein the permeate mixture is enriched in the first gas component, and the retentate mixture is depleted in the first gas component.

2. The method of claim 1, wherein the first dense silicone membrane is a nonporous silicone membrane.

3. The method of claim 1, wherein the first dense silicone membrane is a hollow fiber membrane module comprising a bundle of hollow fibers, wherein the fibers collectively have a bore side and a shell side, wherein at least one of
   the first side of the hollow fiber membrane is the bore side and the second side of the hollow fiber membrane is the shell side, and
   the first side of the hollow fiber membrane is the shell side and the second side of the hollow fiber membrane is the bore side.

4. The method of claim 1, wherein the organosilicon fluid comprises at least one of an organosiloxane and an organosilane.

5. The method of claim 1, wherein the organosilicon fluid comprises at least one at least one silicon-bonded hydroxy group, at least one silicon-bonded ether, at least one silicon-bonded polyether, or a combination thereof.

6. The method of claim 5, wherein the silicon-bonded hydroxy group, silicon-bonded ether, or at least one silicon-bonded polyether is bonded to a non-terminal-silicon.

7. The method of claim 1, wherein the feed mixture comprises water vapor and the permeate mixture is enriched in water vapor.

8. A method of removing a gas from a mixture, the method comprising:
   contacting a first side of a first dense silicone membrane with a feed mixture comprising a first gas component and at least one of a second gas component and a first liquid component; and
   contacting a second side of the membrane with a sweep liquid consisting essentially of an organosilicon fluid consisting essentially of a silane, a polysilane, a siloxane, a polysiloxane or a combination of two or more of the silane, the polysilane, the siloxane, and the polysiloxane, wherein the silane, the polysilane, the siloxane, the polysiloxane or the combination of two or more of the silane, the polysilane, the siloxane, and the polysiloxane comprises at least one of a hydroxy group, an ether group, an acrylate group, a methacrylate group, an acrylamide group, a methacrylamide group, and a polyether group, to produce a permeate mixture on the second side of the membrane and a retentate mixture on the first side of the membrane, wherein the permeate mixture is enriched in the first gas component, and the retentate mixture is depleted in the first gas component.

9. The method of claim 8, wherein the first dense silicone membrane is a hollow fiber membrane module comprising a bundle of hollow fibers, wherein the fibers collectively have a bore side and a shell side, wherein at least one of
   the first side of the hollow fiber membrane is the bore side and the second side of the hollow fiber membrane is the shell side, and
   the first side of the hollow fiber membrane is the shell side and the second side of the hollow fiber membrane is the bore side.

10. The method of claim 8, wherein the organosilicon fluid comprises at least one of an organosiloxane and an organosilane.

11. The method of claim 8, wherein the organosilicon fluid comprises at least one at least one silicon-bonded hydroxy group, at least one silicon-bonded ether, at least one silicon-bonded polyether, or a combination thereof.

12. The method of claim 11, wherein the silicon-bonded hydroxy group, silicon-bonded ether, or at least one silicon-bonded polyether is bonded to a non-terminal-silicon.

13. The method of claim 8, wherein the feed mixture comprises carbon dioxide and at least one of nitrogen and methane and the permeate mixture is enriched in carbon dioxide.

14. The method of claim 8, wherein the feed mixture comprises water vapor and the permeate mixture is enriched in water vapor.

15. The method of claim 8, wherein the first dense silicone membrane is a free-standing membrane.

16. A method of removing a gas from a liquid, the method comprising:

contacting a first side of a first dense silicone membrane with a gaseous stream; and contacting a second side of the membrane with a liquid consisting essentially of an organosilicon fluid consisting essentially of a first gas component and a silane, a polysilane, a siloxane, a polysiloxane or a combination of two or more of the silane, polysilane, siloxane, and polysiloxane and where the silane, polysilane, siloxane, polysiloxane or the combination of two or more of the silane, polysilane, siloxane, and polysiloxane comprises at least one of a hydroxy group, an ether group, an acrylate group, a methacrylate group, an acrylamide group, a methacrylamide group, and a polyether group, to produce a gaseous permeate mixture on the first side of the membrane and a retentate organosilicon fluid on the second side of the membrane, wherein the permeate mixture is enriched in the first gas component, and the retentate organosilicon fluid is depleted in the first gas component.

* * * * *